United States Patent
Karadagur Ananda Reddy et al.

(10) Patent No.: US 12,456,476 B2
(45) Date of Patent: Oct. 28, 2025

(54) NOISE SUPPRESSION FOR SPEECH DATA WITH REDUCED POWER CONSUMPTION

(71) Applicant: Google LLC, Mountain View, CA (US)

(72) Inventors: Chandan Karadagur Ananda Reddy, Cupertino, CA (US); Navin Chatlani, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 405 days.

(21) Appl. No.: 18/081,492

(22) Filed: Dec. 14, 2022

(65) Prior Publication Data

US 2024/0203438 A1    Jun. 20, 2024

(51) Int. Cl.
*G10L 21/0232* (2013.01)
*G10L 21/0224* (2013.01)
*G10L 25/60* (2013.01)
*G10L 21/0216* (2013.01)

(52) U.S. Cl.
CPC ...... *G10L 21/0232* (2013.01); *G10L 21/0224* (2013.01); *G10L 25/60* (2013.01); *G10L 2021/02163* (2013.01)

(58) Field of Classification Search
CPC .. G10L 21/0232; G10L 21/0224; G10L 25/60
See application file for complete search history.

(56) References Cited

U.S. PATENT DOCUMENTS

| | | |
|---|---|---|
| 6,785,339 B1 | 8/2004 | Tahernezhaadi et al. |
| 9,640,194 B1 * | 5/2017 | Nemala ............... G10L 21/0232 |
| 2005/0278172 A1 | 12/2005 | Koishida et al. |
| 2013/0304461 A1 | 11/2013 | Taleb et al. |
| 2022/0124433 A1 * | 4/2022 | Kupryjanow ........... G10L 25/30 |
| 2023/0125150 A1 * | 4/2023 | Cutler ................... G06F 18/214 706/15 |
| 2024/0071356 A1 * | 2/2024 | Gu ................... G10K 11/17854 |

(Continued)

OTHER PUBLICATIONS

Dubey, Harishchandra et al., "ICASSP 2022 Deep Noise Suppression Challenge", arXiv:2202.13288v1, Feb. 27, 2022, 5 pages.

(Continued)

*Primary Examiner* — Bhavesh M Mehta
*Assistant Examiner* — Joseph J. Yamamoto
(74) *Attorney, Agent, or Firm* — IP Spring

(57) ABSTRACT

Implementations described herein relate to providing noise suppression for speech data with reduced power consumption. In some implementations, a computer-implemented method includes receiving a current time frame of speech data, e.g., after receiving a previous time frame associated with a previous noise suppression mask. The current time frame is transformed to a current frequency frame in the frequency domain. A noise classifier is used to determine whether to create a current noise suppression mask for the current frame. If it is determined to create the mask, the mask is created and multiplied by the current frequency frame to obtain a noise-suppressed frequency frame. If it is determined to not create the current mask, the previous noise suppression mask is multiplied with the current frequency frame to obtain the noise-suppressed frequency frame, without creating a mask. The noise-suppressed frequency frame is transformed to a time frame and output.

17 Claims, 4 Drawing Sheets

(56) References Cited

U.S. PATENT DOCUMENTS

2024/0296856 A1* 9/2024 Huang .................... G10L 25/21

OTHER PUBLICATIONS

EPO, International Search Report for International Patent Application No. PCT/US2023/033592, Feb. 21, 2024, 4 pages.

EPO, Written Opinion for International Patent Application No. PCT/US2023/033592, Feb. 21, 2024, 9 pages.

Esquef, Paulo A. et al., "A Double-threshold Based Approach to Impulsive Noise Detection in Audio Signals", 2000 10th European Signal Processing Conference, 2000, 4 pages.

Moattar, M. H. et al., "A Simple but Efficient Real-Time Voice Activity Detection Algorithm", 17th European Signal Processing Conference (EUSIPCO 2009), 2009, 5 pages.

Oudre, Laurent, "Automatic Detection and Removal of Impulsive Noise in Audio Signals", Image Processing On Line, Nov. 21, 2015, 15 pages.

Rix, Antony et al., "Perceptual Evaluation of Speech Quality (PESQ)—A New Method for Speech Quality Assessment of Telephone Networks and Codecs", 2001 IEEE international conference on acoustics, speech, and signal processing, Proceedings (Cat. No. 01CH37221), vol. 2, 2001, 4 pages.

Tagliasacchi, Marco et al., "SEANet: a Multi-modal Speech Enhancement Network", INTERSPEECH 2020, Oct. 2020, 5 pages.

Reddy, et al., "Dnsmos P.835: A Non-Intrusive Perceptual Objective Speech Quality Metric to Evaluate Noise Suppressors", ICASSP 2022—2022 IEEE International Conference on Acoustics, Speech and Signal Processing (ICASSP), (https://ieeexplore.ieee.org/abstract/document/9746108), Feb. 4, 2022, 5 Pages.

Reddy, et al., "Dnsmos: A Non-Intrusive Perceptual Objective Speech Quality Metric to Evaluate Noise Suppressors", ICASSP 2021—2021 IEEE International Conference on Acoustics, Speech and Signal Processing (ICASSP), (https://ieeexplore.ieee.org/abstract/document/9414878), Feb. 10, 2021, 5 Pages.

Lo, et al., "MOSNet: Deep Learning based Objective Assessment for Voice Conversion", Institute of Information Science (https://arxiv.org/pdf/1904.08352.pdf), Jul. 14, 2021, 5 pages.

Zhang, et al., "Multi-Scale Temporal Frequency Convolutional Network with Axial Attention for Multi-Channel Speech Enhancement", ICASSP 2022—2022 IEEE International Conference on Acoustics, Speech and Signal Processing (ICASSP), (https://ieeexplore.ieee.org/document/9746902), May 23-27, 2022.

Kong, et al., "Speech enhancement with weakly labelled data from AudioSet", (https://arxiv.org/abs/2102.09971), Feb. 19, 2021, 5 Pages.

Zorila, et al., "A fast algorithm for improved intelligibility of speech-in-noise based on frequency and time domain energy reallocation", INTERSPEECH, Sep. 2015, p. 60-64.

Zezario, et al., "Deep Learning-Based Non-Intrusive Multi-Objective Speech Assessment Model With Cross-Domain Features", IEEE/ACM Transactions on Audio, Speech, and Language Processing, vol. 31 (https://ieeexplore.ieee.org/stamp/stamp.jsp?arnumber=9905733), Sep. 29, 2022, pp. 54-70.

Braun, et al., "Towards Efficient Models for Real-Time Deep Noise Suppression", ICASSP 2021—2021 IEEE International Conference on Acoustics, Speech and Signal Processing (ICASSP), (https://arxiv.org/pdf/2101.09249.pdf), May 19, 2021, 5 Pages.

Abdulatif, et al., "CMGAN: Conformer-Based Metric-GAN for Monaural Speech Enhancement", (https://arxiv.org/pdf/2209.11112.pdf), Sep. 23, 2022, 16 pages.

Ju, et al., "TEA-PSE: Tencent-Ethereal-Audio-Lab Personalized Speech Enhancement System for ICASSP 2022 DNS Challenge", ICASSP 2022—2022 IEEE International Conference on Acoustics, Speech and Signal Processing (ICASSP), (https://ieeexplore.ieee.org/abstract/document/9747765), May 23-27, 2022.

* cited by examiner

NOISE SUPPRESSION FOR SPEECH DATA WITH REDUCED POWER CONSUMPTION

BACKGROUND

Background noise suppression is often used in devices that output audio, such as ear buds, hearing aids, phones, watches, etc. For example, noise suppression features deployed on such devices can receive speech input at a microphone, estimate particular frequencies at which background noise is present, reduce magnitudes of the audio at those frequencies in the speech data, and output resulting audio that has reduced background noise. This process can involve significant computational complexity, which consumes significant power and hence quickly reduces battery life of the devices.

The background description provided herein is for the purpose of generally presenting the context of the disclosure. Work of the presently named inventors,to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, devices, and computer-readable media to provide noise suppression for speech data with reduced power consumption. In some implementations, a computer-implemented method includes receiving, by one or more processors, a current time frame of speech data in a time domain. The method includes transforming the current time frame to a current frequency frame of the speech data in a frequency domain, and determining, using a noise classifier, whether to create a current noise suppression mask for the current frequency frame based at least on noise content in the current frequency frame. In response to determining to create the current noise suppression mask, the method includes creating the current noise suppression mask for the current frequency frame based on the noise content in the current frequency frame; and multiplying the current noise suppression mask with the current frequency frame to obtain a current noise-suppressed frequency frame of the speech data. In response to determining not to create the current noise suppression mask, the method includes multiplying another noise suppression mask with the current frequency frame to obtain the current noise-suppressed frequency frame of the speech data, without creating the current noise suppression mask. The method includes transforming the current noise-suppressed frequency frame of the speech data to a current noise-suppressed time frame of the speech data that is in the time domain, and outputting the current noise-suppressed time frame of the speech data.

Various features of the method are disclosed. For example, in some implementations, the current time frame can be received after receiving a first time frame of the speech data in the time domain, where the current time frame and the first time frame include speech content and the other noise suppression mask is associated with the first time frame. In some implementations, the noise classifier uses a machine-learning model to determine whether to create the current noise suppression mask for the current frequency frame. In some implementations, the machine-learning model is trained based on speech data that does not include noise and noise data that includes background noise. In some implementations, the machine-learning model is trained using a speech quality predictor that estimates a quality of the speech data. In some implementations, determining whether to create the current noise suppression mask for the current frequency frame is based on a magnitude of the noise content in the current frequency frame. In some implementations, determining whether to create the current noise suppression mask is based on a rate of change of the noise content in the current time frame relative to noise content in one or more previous time frames.

In some implementations, the method further includes receiving a second time frame of the speech data in the time domain; transforming the second time frame to a second frequency frame of the speech data in the frequency domain; determining, using a noise classifier, and whether to create a second noise suppression mask for the second frequency frame based at least on noise content in the second frequency frame. The method includes, in response to determining to create the second noise suppression mask, creating a second noise suppression mask based on the second frequency frame, multiplying the second noise suppression mask with the second frequency frame to obtain a second noise-suppressed frequency frame; transforming the second noise-suppressed frequency frame to a second noise-suppressed time frame; and outputting the second noise-suppressed time frame of the speech data.

Some implementations provide a computing device that includes a processor and a memory coupled to the processor. The memory may have instructions stored thereon that, when executed by the processor, cause the processor to perform operations that include one or more of the features described above for the method.

Some implementations provide a device that includes at least one battery, at least one microphone, a communication circuit coupled to the battery and the microphone, a processor coupled to the battery and the microphone, and a memory coupled to the processor, with instructions stored thereon. When executed by the processor, the instructions cause the processor to perform operations including receiving, by the processor, a current time frame of speech data in a time domain after receiving a first time frame of the speech data in the time domain, wherein the current time frame and the first time frame include speech content, and wherein a first noise suppression mask is associated with the first time frame; transforming the current time frame of speech data to a current frequency frame of the speech data in a frequency domain; determining, using a noise classifier, whether to create a current noise suppression mask for the current frequency frame based at least on noise content in the current frequency frame. In response to determining to create the current noise suppression mask, the method includes creating the current noise suppression mask for the current frequency frame based on the noise content in the current frequency frame, and multiplying the current noise suppression mask with the current frequency frame to obtain a current noise-suppressed frequency frame of the speech data. In response to determining to not create the current noise suppression mask, the method includes multiplying the first noise suppression mask with the current frequency frame to obtain the current noise-suppressed frequency frame of the speech data, without creating the current noise suppression mask. The method includes transforming the current noise-suppressed frequency frame of the speech data to a current noise-suppressed time frame of the speech data that is in the time domain.

Some implementations provide a non-transitory computer-readable medium with instructions stored thereon that, when executed by a processor, cause the processor to perform operations that may be similar to one or more features described above for the method and devices.

DETAILED DESCRIPTION

Figure 1:
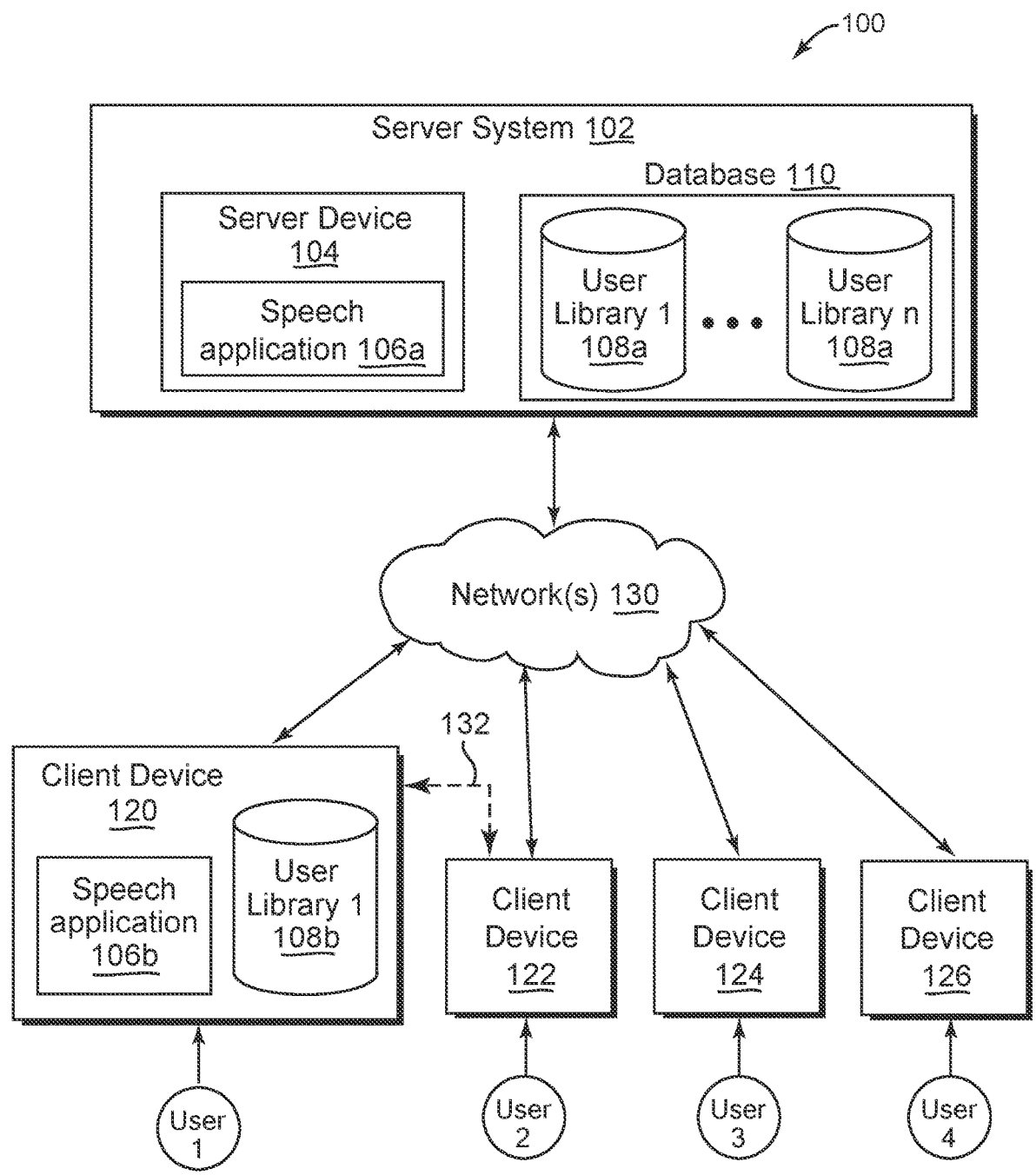
FIG. 1 is a block diagram of an example network environment which may be used for one or more implementations described herein.

This disclosure relates to providing noise suppression for speech data with reduced power consumption. A method or system can receive speech data that includes speech content and background noise content. A noise classifier is used to detect noise in a given frame of the speech data and determine whether a noise suppression mask is to be created for that frame based at least on noise content in the frame. If the noise suppression mask is not to be created, a previously-created noise suppression mask is used to suppress noise in the speech data. In various implementations, a machine learning model can be used by the noise classifier to determine whether to use a previous noise suppression mask or to create a new noise suppression mask for the given frame of speech data. Determining whether to create the current noise suppression mask can be based on a magnitude of the noise content in the current frequency frame, and/or based on a rate of change of the noise content in the current time frame relative to noise content in one or more previous frames.

Described features advantageously provide noise suppression in digital speech data processed by a device while also providing low power consumption by the device. For example, in previous systems, a noise suppression mask is created for every frame of input speech data (e.g., every time-frequency index). Computation of a unique mask at every time step is effective when there is non-stationary noise in the background. However, when there is relatively stationary noise or when there are low levels of background noise with reference to the speech content, the mask does not change significantly over short periods of consecutive frames. Thus, such systems waste resources by computing new noise-suppression masks when such new masks are not needed.

In contrast, features described herein include creating or updating a noise suppression mask less frequently than in prior systems by using a classifier to determine when creation of a noise suppression mask can be skipped, e.g., by determining when a previously-created mask can continue to be used for multiple successive frames. Skipping of mask creation at particular time-frequency steps results in significant reduction in power consumption. Furthermore, the computational complexity of the classifier is negligible in comparison to that of computation of a noise suppression mask.

Technical advantages of described features thus include reduction of consumption of power resources on a device, which is especially significant for devices operating with batteries or other limited power supply (e.g., many portable devices). Described features allow improvement of the quality of speech output by a device while keeping device power consumption low.

Further to the descriptions herein, a user may be provided with controls allowing the user to make an election as to both if and when systems, programs, or features described herein may enable collection of user information (e.g., information about a user's speech data as detected by a microphone, a user's context, a user's devices and device types, a user's preferences including for noise suppression and speech processing, a user's current location, or audio data), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 illustrates a block diagram of an example network environment 100, in which some implementations described herein may be employed. Network environment 100 includes one or more server systems, e.g., server system 102 in the example of FIG. 1, and a plurality of client devices, e.g., client devices 120-126, each associated with a respective user of users U1-U4. Each of server system 102 and client devices 120-126 may be configured to communicate via a network 130.

Server system 102 can include a server device 104 and a database 110. In some implementations, server device 104 may provide speech application 106a. In FIG. 1 and the remaining figures, a letter after a reference number, e.g., "106a," represents a reference to the element having that particular reference number. A reference number in the text without a following letter, e.g., "106," represents a general reference to embodiments of the element bearing that reference number.

Database 110 may be stored on a storage device that is part of server system 102. In some implementations, database 110 may be implemented using a relational database, a key-value structure, or other type of database structure. In some implementations, database 110 may include a plurality of partitions, each corresponding to a respective library for each of users 1-4. For example, as seen in FIG. 1, database 110 may include a first library (user library 1, 108a) for user 1, and other libraries (user library 2, . . . , user library n) for various other users. While FIG. 1 shows a single database 110, it may be understood that database 110 may be implemented as a distributed database, e.g., over a plurality of database servers. Further, while FIG. 1 shows a plurality of partitions, one for each user, in some implementations, each library may be implemented as a separate database.

Library 108a may store content data associated with user 1 (such as images, videos, speech data, etc.), metadata associated with the content data, and one or more other database fields, stored in association with the content data. Access permissions for library 108a may be restricted such that user 1 can control how content data in library 108a may be accessed, e.g., by application 106, by other applications, and/or by one or more other users. Server system 102 may be configured to implement the access permissions, such that data of a particular user is accessible only as permitted by the user.

Speech data as referred to herein includes digital data that has been converted from analog data captured by a microphone, where the analog data includes speech content spoken or otherwise emitted by a user and additional audio, such as background noise in the user's environment. In various implementations, speech data can be provided in any standardized audio file format. Noise or noise content are unwanted signals (e.g., audio that competes with information that the user wishes to transmit via speech) that may be present in captured speech data, such as background noise occurring while a user speaks into a microphone.

Network environment 100 can include one or more client devices, e.g., client devices 120, 122, 124, and 126, which may communicate with each other and/or with server system 102 via network 130. Network 130 can be any type of communication network, including one or more of the Internet, local area networks (LAN) such as WiFi networks, wide area networks (WAN) such as cellular networks, wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communication between two client devices 120 and 122 is shown by arrow 132.

In various implementations, users 1, 2, 3, and 4 may communicate with server system 102 and/or each other using respective client devices 120, 122, 124, and 126. In some examples, users 1, 2, 3, and 4 may interact with each other via applications running on respective client devices and/or server system 102 and/or via a network service, e.g., a social network service or other type of network service, implemented on server system 102. For example, respective client devices 120, 122, 124, and 126 may communicate data to and from one or more server systems, e.g., server system 102.

In some implementations, the server system 102 may provide appropriate data to the client devices such that each client device can receive communicated content or shared content uploaded to the server system 102 and/or a network service. In some examples, users 1-4 can interact via audio or video conferencing, audio or image data sharing, audio, video, or text chat, or other communication modes or applications.

A network service implemented by server system 102 can include a system allowing users to perform a variety of communications, form links and associations, upload and post shared content such as images, text, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide speech application 106b. Client devices 122-126 may also provide similar applications. Image application 106a may be implemented using hardware and/or software of client device 120. In different implementations, image application 106a may be a standalone client application, e.g., executed on any of client devices 120-124, or may work in conjunction with image application 106b provided on server system 102.

Speech application 106 may provide various features, implemented with user permission, that are related to speech data processing and/or output. For example, speech processing features provided by speech application 106 can include one or more of capturing speech from a user using one or more microphones, modifying the speech data (e.g., automatically and/or based on user input), storing speech data (with user permission and as specified in user settings) in a library 108 (e.g., as standalone audio files and/or included in video files or other types of data files), providing user interfaces to output and/or edit speech data, etc. In some implementations, speech application 106 includes additional features besides speech data processing functions. For example, a communications application (e.g., chat application, videoconference application, etc.) can be considered a speech application that includes speech processing as well as processing of other types of data, e.g., text, images, video, etc.

In various implementations described herein, with user permission, the features provided by speech application 106 may include programmatically analyzing speech data to determine audio features in the speech data (e.g., speech, noise, or other types of audio) using one or more user-permitted techniques such as voice recognition, etc. In some implementations, speech application 106 can generate one or more labels for each audio feature detected in speech data and store the labels in library 108. The labels for each speech data segment may be stored in association with the speech data segment in library 108. In some implementations, with user permission, speech application 106 may programmatically analyze speech data to generate related data and store such data in library 108. For example, speech application 106 can generate speech data transcriptions (e.g., using speech recognition).

Speech application 106 can generate noise-suppressed speech data from received speech data using one or more features described herein. For example, the noise-suppressed speech data can be output by the device executing speech application 106, and/or can be transmitted to one or more other devices such as server system 102 (or other server system) or one or more client devices 120-124. Upon generating the noise-suppressed speech data, speech application 106 may update library 108 to store the generated speech data.

While the foregoing description refers to a variety of features of speech application 106, it will be understood that in various implementations, speech application 106 may provide fewer or more features. Further, each user is provided with options to enable and/or disable certain features.

Client device 120 may include a library 108b of user 1, which may be a standalone library. In some implementations, library 108b may be usable in combination with library 108a on server system 102. For example, with user permission, library 108a and library 108b may be synchronized via network 130. In some implementations, library 108 may include speech data segments (e.g., standalone audio files, audio included in video, etc.) associated with user 1, e.g., speech data capturing speech voiced by the user, speech data shared with the user 1 (e.g., from respective other client devices and/or libraries of other users 2-4), speech data downloaded by the user 1 (e.g., from websites, from messaging applications, etc.), and other speech data.

In some implementations, library 108b on client device 120 may include a subset of speech data that is stored by library 108a on server system 102. For example, such implementations may be advantageous when a limited amount of storage space is available on client device 120.

In different implementations, client device 120 and/or server system 102 may include other applications (not shown) that may be applications that provide various types of functionality, e.g., image capture and/or editing, calendar, address book, e-mail, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.) and so on. In some implementations, one or more of the other applications may be standalone applications that execute on client device 120. In some implementations, one or more of the other applications may access a server system, e.g., server system 102, that provides data and/or functionality of the other applications.

A user interface on a client device 120, 122, 124, and/or 126 can enable the display of user content and other content, including audio content, images, video, text, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

For ease of illustration, FIG. 1 shows one block for server system 102, server device 104, database 110, and shows four blocks for client devices 120, 122, 124, and 126. Server blocks 102, 104, and 110 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 110 may be stored on storage devices provided in server system block(s) that are separate from server device 104 and can communicate with server device 104 and other server systems via network 130.

Also, there may be any number of client devices. Each client device can be any type of electronic device, e.g., desktop computer, laptop computer, portable or mobile device, cell phone, smartphone, tablet computer, television, TV set top box or entertainment device, wearable devices (e.g., display glasses or goggles, wristwatch, headset, armband, jewelry, etc.), personal digital assistant (PDA), media player, game device, etc. In some implementations, network environment 100 may not have all of the components shown and/or may have other elements including other types of elements instead of, or in addition to, those described herein.

Other implementations of features described herein can use any type of system and/or service. For example, other networked services (e.g., connected to the Internet) can be used instead of or in addition to a social networking service.

Any type of electronic device can make use of features described herein. Some implementations can provide one or more features described herein on one or more client or server devices disconnected from or intermittently connected to computer networks. In some examples, a client device including or connected to a display device can process speech data stored on storage devices local to the client device, e.g., received previously over communication networks.

Figure 2:
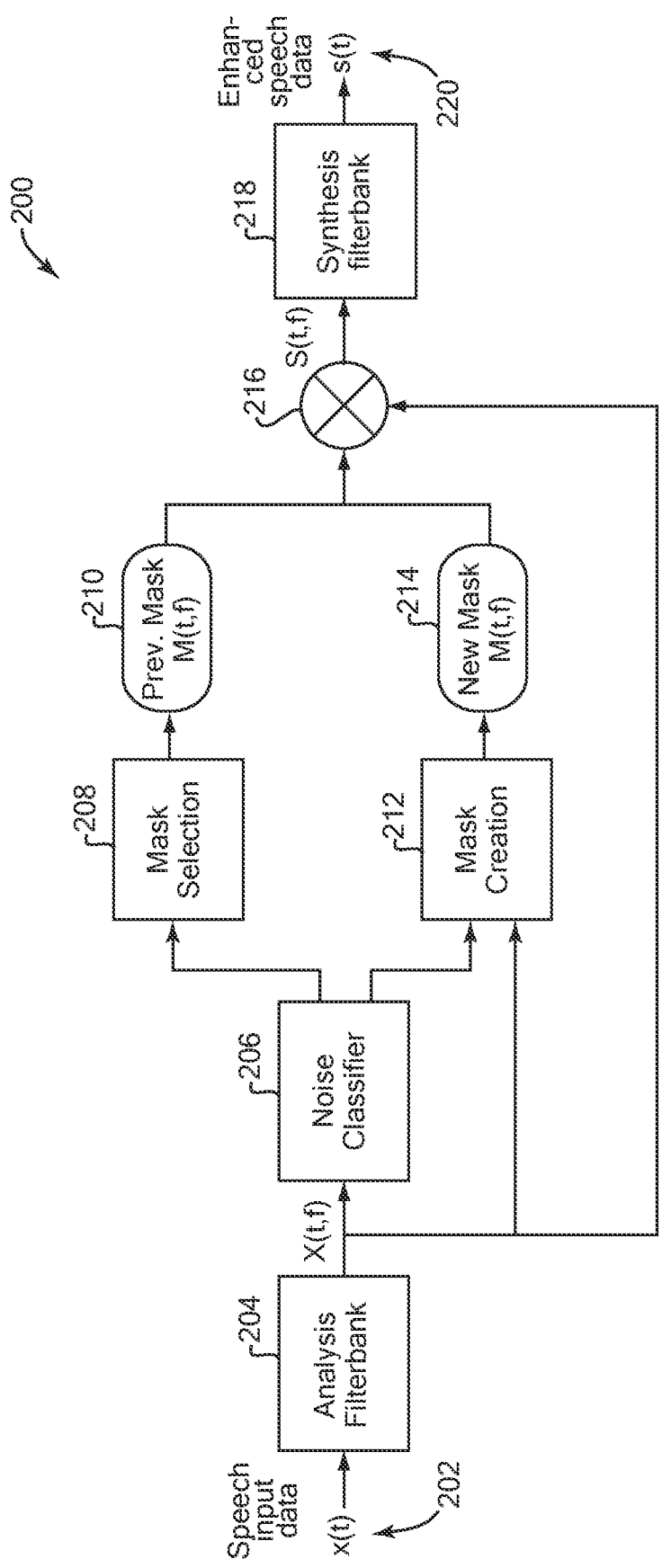
FIG. 2 is a block diagram illustrating an example system to provide noise suppression for speech data with reduced power consumption, according to some implementations.

FIG. 2 is a block diagram illustrating a system 200 to provide noise suppression for speech data with reduced power consumption, in accordance with some implementations. In some implementations, some or all of the system 200 can be implemented on one or more client devices 120, 122, 124, or 126 as shown in FIG. 1. In some implementations, system 200 can be implemented on one or more server devices, e.g., server system 102 of FIG. 1. In some implementations, system 200 can be implemented on both server device(s) and client device (e.g., some components on a client device and some components on a server device). In some implementations, system 200 can be implemented by speech application 106 of FIG. 1 and/or hardware components of a device executing speech application 106.

Speech input data 202 is received or otherwise obtained by system 200. In some implementations, speech input data 202 can be provided as a speech data segment (e.g., a file, an audio stream, or other data) having a sequence, a beginning, and an end. Speech input data 202 includes speech content from one or more users. In some cases, speech input data 202 can be time-based (e.g., time-sampled) data derived from speech of a user. For example, the user can speak into a microphone (or multiple microphones) that is connected to system 200. In some examples, the microphone can be included in a client device such as a smartphone, telephone, laptop computer, earbuds, headphones, webcam, etc., or can be a separate microphone connected to a client device via wired or wireless connections. The user's speech is converted into a time domain speech signal x(t). In some examples, the user's speech can be provided as a monologue or narration, during a conversation with one or more other users as a part of a phone call, video call, videoconference, etc., or can include one or more voice commands. The speech can be captured by the system 200 along with other user-permitted data such as video, images, motion or orientation, and/or other data using other sensors of the system such as cameras, motion sensors, etc.

In many cases, speech input data 202 includes speech content as well as noise content contributed by background noise present when the speech was captured. For example, the background noise can be other speech from other users, sounds of objects moving or colliding, or any other sounds detected by the microphone while the user is speaking.

In some cases or implementations, the speech input data 202 can be received as audio data that is in a form of a time domain speech signal x(t). For example, an audio file can be received by system 200 that includes speech from a person that need not be the user of the device, e.g., a voice mail message or speech data in a video or voice call or message from another user that is stored or received on a device accessible to system 200.

Speech input data 202 can be delineated into multiple successive time frames in the time domain, where each frame is a portion of the speech input data, and each frame can span the same amount of time (e.g., a frame size of 20 milliseconds or other length of time).

An analysis filterbank 204 can receive speech input data 202 in the form of time frame x(t). For example, analysis filterbank 204 can receive time frames of the speech input data in succession. For each time frame, analysis filterbank 204 can transform speech input data 202 from the time domain to the frequency domain to create a frequency frame. Analysis filterbank 204 can be an array of filters that separates a speech input signal into multiple components that each correspond to a different frequency band. In some examples, a fast Fourier transform (FFT) can be used to transform the speech input data, and/or another transformation technique can be used. For example, a frame of time domain data x(t) can be transformed into a corresponding "frequency frame" that is a set of frequency domain data indicated by X(t,f), where t is the time frame index and f is a frequency bin index. Thus, a frequency frame can include X(t,f) data for each frequency bin within the time frame. The X(t,f) data, for example, can correspond to magnitude and phase.

A noise classifier 206 can receive each frequency data value X(t,f) of the current frequency frame. In some implementations, classifier 206 can be a binary classifier that analyzes the frequency data values of the current frame to determine one of two different classifications for the current frame, e.g., the classifier maps the current frequency frame to one of two different classifications. In some implementations, the two classifications are: 1) an amount of noise present in the current frame that is sufficiently high to create a noise suppression mask for the current frame, or 2) an amount of noise present in the current frame that is sufficiently low to allow use of a previously-created mask for the current frame, e.g., a mask that was created by system 200 for a previous time frame of the speech input data 202.

In some implementations, noise classifier 206 can be a machine learning binary classifier that implements one or more machine learning models to determine the classification of the frequency frame described above.

In some implementations, the machine learning classifier can include a machine learning model that is trained to determine when noise is present in speech data and when it is absent from speech data (or whether there is just background noise present without speech). The machine learning model can be trained to detect whether or not there is noise present in the current frame. In some implementations, audio features in the current frame can be extracted and used as input to the machine learning model, such as spectral audio features (e.g., spectral centroid, spectral bandwidth, spectral contrast, spectral rolloff, tonal centroid features, zero-crossing rate, etc.).

The model determines whether a noise suppression mask is to be created for the current frame or a previous mask is to be used. For example, in some implementations, if any noise is detected in the current frame, then the model determines that a noise suppression mask is to be created for the current frame and a previous mask is not to be used; and if no noise is detected in the current frame, then the model determines that a previous mask is to be used and no new mask is to be created for the current frame. The machine learning model can be trained to detect noise and decide on using a previous mask or creating a new mask based on training inputs that include clean speech data (without background noise) (as an ideal target), noise data without speech (e.g., background noise), and/or noisy speech data that includes a combination of clean speech and background noise. In some implementations, the noisy speech data can be a combination of the clean speech data and the noisy data without speech, where the clean speech data and noisy data are also separately input to the model as training data. During training of the model, if a decision of the model causes output speech data to not have noise (as compared to the clean speech data), then it is positive feedback for training the model, and if a decision causes output speech data to have noise (as compared to the clean speech data), then it is negative feedback for training the model.

In some implementations, the machine learning classifier can include a machine learning model that is trained based on the output of a speech quality predictor that is used to determine a speech quality of the frame of speech data. A speech quality predictor is a machine learning model that can provide a numerical rating or other indication of speech quality based on input speech data, where higher speech quality indicates less noise present in the speech data and lower speech quality indicates more noise present in the speech data. Thus, the rating can be an indication of noise magnitude in the frame. For example, the speech quality predictor can provide a particular rating within a range of numerical ratings that indicate low quality speech to high quality speech, e.g., a scale of 1 to 5, 1 to 10, 0 to 1, etc. The speech quality can be determined by the predictor based on noise and other factors. In some examples, a speech quality predictor such as DNSMOS (Deep Noise Suppression Mean Opinion Score) or similar machine learning predictors can be used.

In some of these implementations, the machine learning classifier can include a machine learning model that is trained based on the rating of the speech quality predictor, e.g., where a high rating for speech data processed by the machine learning model is positive feedback for the model, and a low rating for the speech data is negative training feedback for the model. For example, if the model makes a decision to use a previous mask for a previous frame, and the speech quality predictor evaluates the resulting speech data and provides an indication of quality above a threshold quality, e.g., a rating above a particular threshold rating, then the machine learning model receives positive feedback for its decision since the noise in the output is not significant. A rating below the threshold rating is treated as negative feedback for the decision since the noise may be considered significant. Similarly, if the model makes a decision to create a new mask, the rating of the speech quality predictor for the resulting speech data can be used to provide positive or negative feedback to the machine learning model.

In some implementations, the above machine learning classifiers can be trained to indicate whether to create a new mask or use a previous mask based on a rate of change of noise magnitudes detected in the current frame relative to one or more previous frames, instead of or in addition to detecting whether noise (or a particular threshold amount of noise) is present in the current frame. For example, the classifier can determine if the rate of change of the noise from the previous frame (or averaged noise from multiple successive previous frames) is greater than a particular change threshold. If the change in noise meets or exceeds the change threshold, then a new noise suppression mask is to be created. If the noise does not meet or exceed the change threshold, then a previous mask is selected to be used for the current frame. In some examples, the change of noise in frames can be detected based on a change in the quality rating from a speech quality predictor as described above.

In some implementations, the machine learning classifier can be trained using ideal mask estimators with the objective of minimizing power consumption of system 200 without compromising on quality of the speech content in the speech data. The machine learning model can be trained to determine to minimize power consumption as a goal, and thus determine to create a new noise suppression mask only when the noise is not stationary, e.g., has changed by an amount that may be noticeable to users. In some examples, to create training samples, a conventional method can be used to generate masks for each time frame of speech data. These can be groundtruth masks which are known to provide a satisfactory user experience. These groundtruth masks are used to train the machine learning classifier, e.g., using supervised learning or other technique. For example, a model being trained may classify a time frame such that a previous frame mask 208 is selected and used when the noise detected in that frame is stationary (e.g., rate of change below a change threshold magnitude). Or the model may classify the time frame such that a new mask 212 is created when the noise is non-stationary (e.g., rate of change above the change threshold magnitude). The decision of the model can be compared with the groundtruth mask for the frame.

For example, if the decision is to use a previous mask, it is determined whether the groundtruth mask for a frame is within a threshold similarity of the groundtruth mask for the previous frame, thus indicating that the rate of change was below the threshold magnitude and the classification to use the previous mask is accurate. Similarly, if the model's decision is to create a new mask, it is determined whether the groundtruth mask for a frame is above the threshold similarity of the groundtruth mask for the previous frame, thus indicating that the rate of change was above the threshold magnitude and the classification to create a new mask is accurate. If the classification is accurate, that is positive feedback to the model. If, on the other hand, the model's decision is to create a mask but the groundtruth mask is within the threshold similarity to the previous frame mask, or if the model's decision is to use the previous mask but the groundtruth mask is above the threshold similarity to the previous frame mask, that is negative feedback to the model.

Thus, the model can receive speech input data 202, determine whether to create a new mask or use a previous mask, and provide the decision to the appropriate block of system 200 as described below.

In some implementations, one or more statistical classifiers and/or rule-based classifiers can be used instead of or in addition to a machine learning classifier. Statistical classifiers can compare data in the current frame to previous data in one or more previous frames using, for example, similarity and/or distance functions. For example, linear classifiers can be used that assign scores to each of the classifications and can weight different features such as rate of change of noise, magnitude of detected noise, etc.

In some examples, a statistical classifier or rule-based classifier can determine the amount of background noise that is present in the current frame and a particular number of previous frames. The classifier can determine if the rate of change of noise in the current frame and one or more previous frames has been constant or is greater than a particular change threshold, and if the noise meets or exceeds the change threshold, then a new noise suppression mask is to be created. If the noise does not meet or exceed the change threshold, then a previous mask is selected to be used for the current frame. The classifier can also or alternatively determine a magnitude of the background noise in the current frame, and if that magnitude meets or exceeds a particular magnitude threshold, then a new noise suppression mask is to be created. If the magnitude of the noise does not meet or exceed the magnitude threshold, then a previous mask is selected to be used for the current frame. Such classifiers can detect signal processing-based features that estimate the magnitude of noise in frames, and/or the spatiality and/or directionality of noise. Such features can include spectral audio features extracted from the speech data, such as spectral centroid, spectral bandwidth, spectral contrast, spectral rolloff, tonal centroid features, zero-crossing rate, etc.

In some implementations, classifier 206 can determine whether or not to create a new noise suppression mask based on the quality of speech indicated by a speech quality predictor that is used to process the current speech data 202 (in contrast to being used for training a model as described above). For example, if the speech quality predictor provides an indication of quality above a threshold quality, e.g., a rating above a particular threshold rating, then the classifier determines to use a previous noise suppression mask and to not create a new noise suppression mask for the current frame. If the speech quality predictor provides a quality rating below the particular threshold rating or amount, then the classifier determines to create and use a new noise suppression mask for the current frame and not use a previous mask. In some examples, a speech quality predictor such as DNSMOS (Deep Noise Suppression Mean Opinion Score) or similar machine learning predictors can be used.

A mask selection block 208 can, in some implementations, receive a signal or command from the noise classifier 206 that indicates to use a previous noise suppression mask for the current frame instead of creating a new noise suppression mask, if the noise classifier 206 has determined to do so. Mask selection block 208 can include or have access to storage that stores one or more previous masks created while processing speech input data 202. In some implementations, the previous mask that is selected for use by mask selection block 208 can be the most recent previous mask that was created by system 200 for speech input data 202 (e.g., the speech data segment or file being processed). Thus, mask selection block 208 selects previous mask 210 that is the most recent noise suppression mask created for speech input data 202. Mask 210 is a mask function M(t,f) that has individual functions that are to be applied to corresponding time-frequency bins of a frequency frame X(t,f). Mask 210 has been used for one or more previous frames of the speech input data 202 and can continue to mask noise in the current frame as determined by classifier 206. Previous mask 210 is provided to the multiplier operation 216 as described below. If the current frame is the first frame of the speech input data 202, there are no previous frames available for data 202, such that mask selection block 208 (or classifier 206) can instruct that a new suppression mask be created by the mask creation block 212 as described below.

A mask creation block 212 can receive a signal or command from noise classifier 206 that indicates to create a new noise suppression mask for the current frame based on the speech content and noise content of the current frame, e.g., instead of using a previous noise suppression mask. Block 212 receives the data X(t,f) in the frequency domain to determine the new mask. Mask creation block 212 can use any of several techniques to create a new noise suppression mask 214 for the current frame, where mask 214 is a mask function M(t,f) that has individual functions that are to be applied to corresponding time-frequency bins of the frequency frame X(t,f). For example, block 212 can form new mask 214 to include gain functions associated with different frequency bands of the current frame, where the gain functions adjust the amplitudes of the speech input data in those frequency bands to suppress noise. In various implementations, new mask 214 can be created to operate on only magnitude, or can operate on both magnitude and phase of the input speech data. In some implementations, the new mask can be created based on mask values of one or more previously-created masks for previous frames of the speech input data 202 as well as being based on the noise content and speech content of the current frame. New mask 214 is provided to the multiplier operation 216.

Multiplier operation 216 is used to multiply the input frequency-domain data X(t,f) of the current frame by either the previous mask 210 or the new mask 214, as determined by the noise classifier 206. Multiplier operation 216 produces noise-suppressed frequency data S(t,f) in the frequency domain, which has noise suppressed based on the mask 210 or 214 that is used.

Synthesis filterbank 218 can receive the current frame of noise-suppressed frequency data S(t,f) in the frequency domain, and transforms the S(t,f) data from the frequency domain to the time domain to create noise-suppressed time frame data 220, indicated as s(t). In some implementations, synthesis filterbank 218 can be an array of filters that performs the inverse operation of analysis filterbank 204, e.g., by processing the multiple frequency components of speech frequency data S(t,f) into time-based data s(t). In some examples, an inverse fast Fourier transform (FFT) can be used to transform the frequency data to time-based data, and/or other transformation technique(s) can be used.

Noise-suppressed time frame data 220 (e.g., enhanced speech data) can be transmitted to components of system 200 for audio output via speakers or other audio output devices, and/or can be transmitted to one or more other devices for audio output. In further examples, the noise-suppressed time frame data can be output to a storage device on the device performing method 300, and/or provided to a different device for storage.

In some examples, a noise reduction algorithm on an earbud device may require about 10 MIPS (million instructions per second) at 16 kHz sampling rate, consuming about 0.7 mW per second. If the user is making a phone call in a silent environment such as a conference room, then the described noise classifier can detect that the noise suppression masks do not need to be updated at every frame. If the classifier, analysis filterbank, and synthesis filterbank require about 0.5-1 MIPS, the resulting power consumption can be reduced by an order of magnitude.

Figure 3:
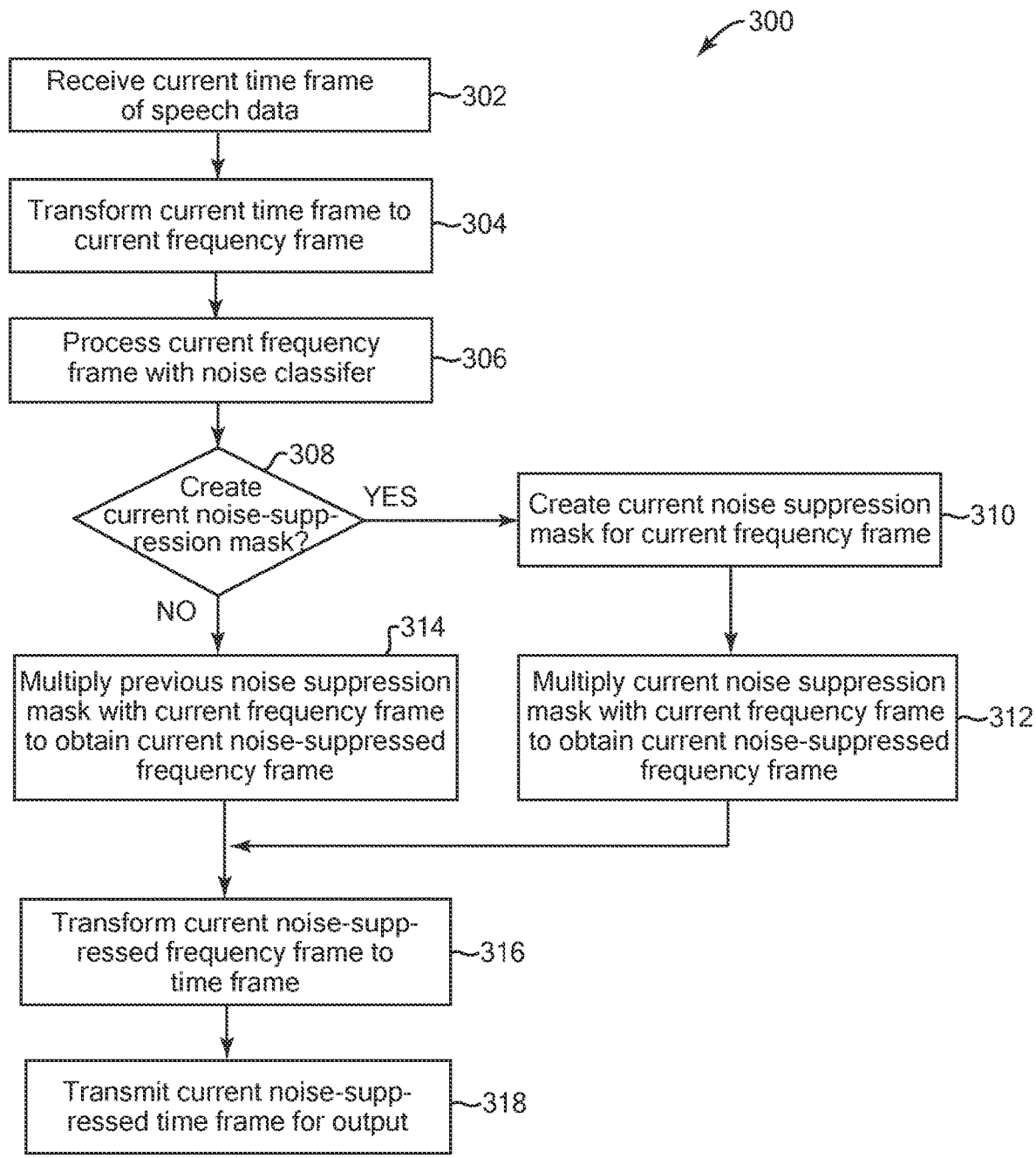
FIG. 3 is a flow diagram illustrating an example method to provide noise suppression for speech data with reduced power consumption, according to some implementations.

FIG. 3 is a flow diagram illustrating an example method 300 to provide noise suppression for speech data with reduced power consumption. In some implementations, method 300 can be implemented, for example, by one or more client devices 120, 122, 124, or 126 as shown in FIG. 1. In some implementations, some or all of the method 300 can be implemented on one or more server systems 102 as shown in FIG. 1, and/or on both server device(s) and client device(s). In described examples, the implementing system includes one or more digital processors or processing circuitry ("processors"), and one or more storage devices (e.g., a database or other storage). In some implementations, different components of one or more servers and/or clients can perform different blocks or other parts of the method 300. Some implementations can have one or more blocks of method 300 performed by one or more other devices (e.g., other client devices or server devices) that can send results or data to the first device.

In some implementations, the method 300, or portions of the method, can be initiated automatically by a system. For example, the method (or portions thereof) can be performed based on one or more particular events or conditions, e.g., input of speech to a microphone of the device by a user, reception of new speech audio file(s) to a server system or client device, and/or one or more other conditions occurring which can be specified in device settings.

Blocks of method 300 are only performed if permission is obtained by a user of the device performing the method 300.

Method 300 may begin at block 302. In block 302, a current time frame of speech input data is received. The current time frame of speech input data is in the time domain and is one frame of multiple frames that are successively received by the device. For example, the time frame may have been sampled from data obtained via a user speaking into a microphone connected to the device. Block 302 may be followed by block 304.

In block 304, the current time frame is transformed to a current frequency frame of speech data that is provided in the frequency domain. For example, the current time frame can be transformed into the current frequency frame by an analysis filterbank 204 as shown in FIG. 2. Block 304 may be followed by block 306.

In block 306, the current frequency frame is processed by a noise classifier to determine whether a current noise-suppression mask should be created for the current frequency frame. As described above with respect to FIG. 2, the classifier can include one or more machine learning models, a statistical classifier, a rule-based classifier, or other type of classifier. This processing can be based on the current frequency frame, and in some cases or implementations, can also be based on one or more previous frames of the speech data that is being received by the device. Some example implementations are described above with reference to noise classifier 106 of FIG. 2. In some examples, the determination can be based on a magnitude of one or more detected noise components in the frequency frame, and/or based on a change in the magnitude of the detected noise components in the frequency frame (e.g., if there have been one or more previous frames of speech data detected immediately previous to the current frame for the received speech data). Block 306 may be followed by block 308.

In block 308, it is determined whether to create a current noise-suppression mask for the current frequency frame, based on the processing of block 306. If a current noise-suppression mask is not to be created, the method continues to block 314, described below. If a current noise-suppression mask is to be created, the process continues to block 310, in which a current (new) noise suppression mask is created for the current frequency frame. For example, a new mask 214 can be created in block 310 using one or more example techniques as described above with reference to FIG. 2. Block 310 may be followed by block 312.

In block 312, the current noise suppression mask is multiplied by the current frequency frame determined in block 304, to obtain a current noise-suppressed frequency frame. Block 312 may be followed by block 316, described below.

If a current noise-suppression mask is not to be created as determined in block 308, the process continues to block 314, in which a previous noise suppression mask is multiplied by the current frequency frame determined in block 304, to obtain a current noise-suppressed frequency frame. For example, the previous noise suppression mask can be a mask 210 created by method 300 in a previous iteration, e.g., the most recent iteration in which a noise-suppression mask was created for the received speech data segment or file. Block 312 may be followed by block 316.

In block 316, the current noise-suppressed frequency frame (obtained via block 312 or block 314) is transformed from to a current noise-suppressed time frame. For example, block 316 can be performed by a synthesis filterbank 218 as described above with reference to FIG. 2. Block 316 may be followed by block 318.

In block 318, the current noise-suppressed time frame is transmitted for output. In some examples, the noise-suppressed time frame can be provided to a hardware interface and output by speakers of the device performing method 300, and/or provided to a different device (e.g., over a communication network) to be similarly output. In further examples, the noise-suppressed time frame can be output to a storage device on the device performing method 300, and/or provided to a different device for storage.

In various implementations, various blocks of method 300 may be combined, split into multiple blocks, performed in parallel, or performed asynchronously. In some implementations, one or more blocks of method 300 may not be performed or may be performed in a different order than shown in FIG. 3. Method 300, or portions thereof, may be repeated any number of times using additional inputs, e.g., additional speech data is received.

Figure 4:
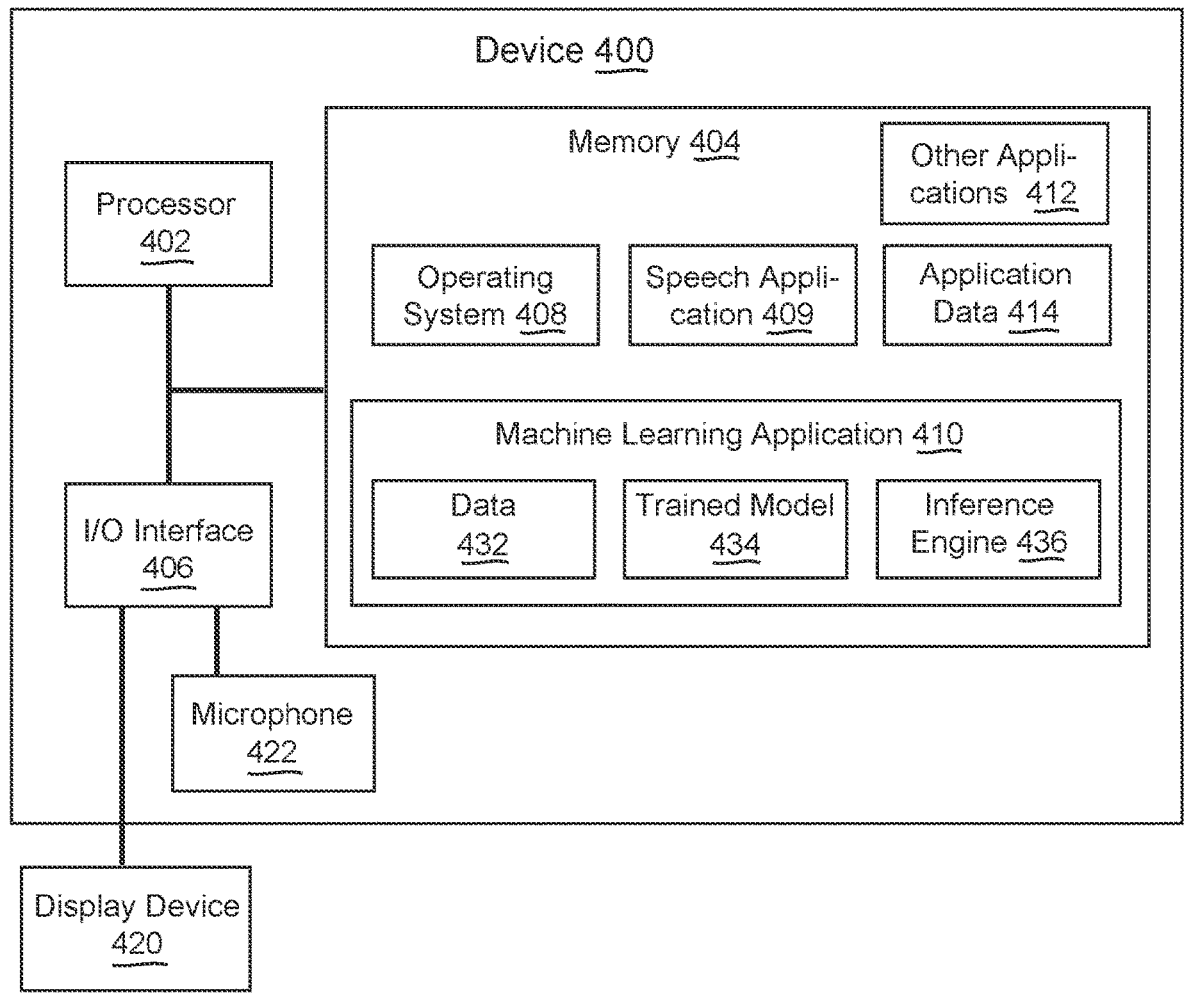
FIG. 4 is a block diagram of an example computing device which may be used to implement one or more features described herein.

FIG. 4 is a block diagram of an example device 400 which may be used to implement one or more features described herein. In some examples, device 400 may be used to implement a client device, e.g., any of client devices 120-126 shown in FIG. 1. The device 400 may for example be advantageously embodied in a battery powered client device, such as a smartphone, personal computer, or PDA, including a battery (not shown) and a communication circuit or circuitry (not shown), to provide efficient noise suppression in real time with reduced power consumption for increased battery life of the device. The device 400 can be a self-contained client device in the sense of providing noise suppression for its embedded audio system, or device 400 may be used with a connected (wired or wireless) supported client device, such as earbuds or a smartwatch, e.g., to provide noise suppression for the supported device's audio system. Alternatively, device 400 can implement a server device, e.g., server device 104, that can provide noise suppression more efficiently, reducing power consumption and heat generation in the server. In some implementations, device 400 may be used to implement a client device, a server device, or both client and server devices. Device 400 can be any suitable computer system, server, or other electronic or hardware device as described above.

One or more methods described herein can operate in several environments and platforms, e.g., as a standalone computer program that can be executed on any type of computing device, as a web application having web pages, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, all computations can be performed within the mobile app (and/or other apps) on the mobile computing device. In another example, a client/server architecture can be used, e.g., a mobile computing device (as a client device) sends user input data to a server device and receives from the server the final output data (e.g., audio data to be output by speakers of the client device). In another example, computations can be split between the mobile computing device and one or more server devices.

In some implementations, device 400 includes a processor 402, a memory 404, and input/output (I/O) interface 406. Processor 402 can be one or more processors and/or processing circuits to execute program code and control basic operations of the device 400. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 402 may include one or more co-processors that implement neural-network processing. In some implementations, processor 402 may be a processor that processes data to produce probabilistic output, e.g., the output produced by processor 402 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 404 is typically provided in device 400 for access by the processor 402, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 402 and/or integrated therewith. Memory 404 can store software operating on the server device 400 by the processor 402, including an operating system 408, speech application 409 (e.g., which may be the same as speech application 106 of FIG. 1), machine learning application 410 (which may be included in a noise classifier as described herein), other applications 412, and application data 414. Other applications 412 may include applications such as a data display engine, image editing applications, image display engine, notification engine, social networking engine, media display applications, communication applications, web hosting engines or applications, media sharing applications, etc. In some implementations, speech application 409 and/or machine learning application 410 can include instructions that enable processor 402 to perform functions described herein, e.g., some or all of blocks of system 200 of FIG. 2 and/or method 300 of FIG. 3. In some implementations, speech data received from users or other devices can be stored as application data 414 or other data in memory 404, and/or on other storage devices of one or more other devices in communication with device 400.

Any of software in memory 404 can alternatively be stored on any other suitable storage location or computer-readable medium. In addition, memory 404 (and/or other connected storage device(s)) can store one or more messages, one or more taxonomies, electronic encyclopedia, dictionaries, digital maps, thesauruses, knowledge bases, message data, grammars, user preferences, and/or other instructions and data used in the features described herein. Memory 404 and any other type of storage (magnetic disk, optical disk, magnetic tape, or other tangible media) can be considered "storage" or "storage devices."

I/O interface 406 can provide functions to enable interfacing device 400 with other systems and devices. Interfaced devices can be included as part of the device 400 or can be separate and communicate with the device 400. For example, network communication devices, storage devices (e.g., memory and/or database), and input/output devices can communicate via I/O interface 406. In some implementations, the I/O interface can connect to interface devices such as input devices (keyboard, pointing device, touchscreen, microphone, camera, scanner, sensors, etc.) and/or output devices (display devices, speaker devices, printers, motors, etc.). In some implementations, hardware used for components of system 200 of FIG. 2 can be included in I/O interface or other connected components of device 400.

Some examples of interfaced devices that can connect to I/O interface 406 can include one or more microphones 422 that can be used to capture speech and other audio such that the speech and audio can be converted to speech data and other audio data by the I/O interface 406 and other components of device 400. Microphones 422 can be connected to device 400 via local connections and/or via networked connections. One or more display devices 420 can be used to display content, e.g., images, video, and/or a user interface of an application. Display device 420 can be connected to device 400 via local connections (e.g., display bus) and/or via networked connections and can be any suitable display device. Display device 420 can include any suitable display device such as an LCD, LED, or plasma display screen, CRT, television, monitor, touchscreen, 3-D display screen, or other visual display device. Display device 420 may also act as an input device, e.g., a touchscreen input device. For example, display device 420 can be a flat display screen provided on a mobile device, multiple display screens provided in glasses or a headset device, or a monitor screen for a computer device.

The I/O interface 406 can interface to other input and output devices. Some examples include one or more cameras which can capture images and/or detect gestures. Some implementations can provide a microphone for capturing sound such as speech or other sounds emitted from a user (e.g., as a part of captured video, voice commands, etc.). Other input and output devices can include a radar or other sensors for detecting gestures, audio speaker devices for outputting sound, etc.

In various implementations, machine learning application 410 may utilize Bayesian classifiers, support vector machines, neural networks, or other learning techniques. In some implementations, machine learning application 410 may include a trained model 434, an inference engine 436, and data 432. In some implementations, data 432 may include training data, e.g., data used to generate trained model 434. For example, training data may include any type of data such as text, images, audio (e.g., speech samples, noise samples, and/or noisy speech samples), video, etc. Training data may be obtained from any source, e.g., a data repository specifically marked for training, data for which permission is provided for use as training data for machine-learning, etc. In implementations where one or more users permit use of their respective user data to train a machine-learning model, e.g., trained model 434, training data may include such user data. In implementations where users permit use of their respective user data, data 432 may include permitted data such as speech data (or other user-generated audio data).

In some implementations, training data may include synthetic data generated for the purpose of training, such as data that is not based on user input or activity in the context that is being trained, e.g., data generated from simulated speech, speech synthesis, or other computer-generated audio data. In some implementations, machine learning application 410 excludes data 432. For example, in these implementations, the trained model 434 may be generated, e.g., on a different device, and be provided as part of machine learning application 410. In various implementations, the trained model 434 may be provided as a data file that includes a model structure or form, and associated weights. Inference engine 436 may read the data file for trained model 434 and implement a neural network with node connectivity, layers, and weights based on the model structure or form specified in trained model 434.

In some implementations, the trained model 434 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers.

For example, the nodes of a first layer (e.g., input layer) may receive data as input data 432 or application data 414. Subsequent intermediate layers may receive as input output of nodes of a previous layer per the connectivity specified in the model form or structure. These layers may also be referred to as hidden layers or latent layers.

A final layer (e.g., output layer) produces an output of the machine learning application. For example, the output may be a noise classification for input speech data as described herein. In some implementations, model form or structure also specifies a number and/or type of nodes in each layer.

In different implementations, trained model 434 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in speech or other audio, etc.

In some implementations, trained model 434 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 432, to produce a result.

For example, training may include applying supervised learning techniques. In supervised learning, the training data can include a plurality of inputs (e.g., a set of speech data frames or samples) and a corresponding expected output for each input (e.g., a set of groundtruth labels indicating noise classification in each speech frame or sample in the set of speech frames or samples). Based on a comparison of the output of the model with the expected output, values of the weights are automatically adjusted, e.g., in a manner that increases a probability that the model produces the expected output when provided similar input.

Machine learning application 410 also includes an inference engine 436. Inference engine 436 is configured to apply the trained model 434 to data, such as application data 414, to provide an inference. In some implementations, inference engine 436 may include software code to be executed by processor 402. In some implementations, inference engine 436 may specify circuit configuration (e.g., for a programmable processor, for a field programmable gate array (FPGA), etc.) enabling processor 402 to apply the trained model. In some implementations, inference engine 436 may include software instructions, hardware instructions, or a combination. In some implementations, inference engine 436 may offer an application programming interface (API) that can be used by operating system 410 and/or other applications 412 to invoke inference engine 436, e.g., to apply trained model 434 to application data 414 to generate an inference. For example, the inference for a noise classifier model may be a noise classification for a frame of speech data.

Machine learning application 410 may provide several technical advantages. For example, when trained model 434 is generated based on unsupervised learning, trained model 434 can be applied by inference engine 436 to produce knowledge representations (e.g., numeric representations) from input data, e.g., application data 414. For example, a model trained for speech analysis may produce representations of speech that have a smaller data size than input speech data. In some implementations, such representations may be helpful to reduce processing cost (e.g., computational cost, memory usage, etc.) to generate an output (e.g., a label, a classification, etc.). In some implementations, such representations may be provided as input to a different machine learning application that produces output from the output of inference engine 436. In some implementations, knowledge representations generated by machine learning application 410 may be provided to a different device that conducts further processing, e.g., over a network. In such implementations, providing the knowledge representations rather than the speech data may provide a technical benefit, e.g., enable faster data transmission with reduced cost.

In some implementations, machine learning application 410 may be implemented in an offline manner. In these implementations, trained model 434 may be generated in a first stage, and provided as part of machine learning application 410. In some implementations, machine learning application 410 may be implemented in an online manner. For example, in such implementations, an application that invokes machine learning application 410 (e.g., operating system 410, speech application 409, or one or more of other applications 412) may utilize an inference produced by machine learning application 410, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 434, e.g., to update embeddings for trained model 434.

In some implementations, machine learning application 410 may be implemented in a manner that can adapt to particular configuration of device 400 on which the machine learning application 410 is executed. For example, machine learning application 410 may determine a computational graph that utilizes available computational resources, e.g., processor 402. For example, if machine learning application 410 is implemented as a distributed application on multiple devices, machine learning application 410 may determine computations to be carried out on individual devices in a manner that optimizes computation. In another example, machine learning application 410 may determine that processor 402 includes a GPU with a particular number of GPU cores (e.g., 1000) and implement the inference engine accordingly (e.g., as 1000 individual processes or threads).

In some implementations, machine learning application 410 may implement an ensemble of trained models. For example, trained model 434 may include a plurality of trained models that are each applicable to the same input data. In these implementations, machine learning application 410 may choose a particular trained model, e.g., based on available computational resources, success rate with prior inferences, etc. In some implementations, machine learning application 410 may execute inference engine 436 such that a plurality of trained models is applied. In these implementations, machine learning application 410 may combine outputs from applying individual models, e.g., using a voting-technique that scores individual outputs from applying each trained model, or by choosing one or more particular outputs. Further, in these implementations, machine learning application 410 may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine learning application, e.g., by operating system 410 or one or more applications 412.

In different implementations, machine learning application 410 can produce different types of outputs. For example, machine learning application 410 can provide representations or clusters (e.g., numeric representations of input data), speech data (e.g., with noise or without), etc. In some implementations, machine learning application 410 may produce an output based on a format specified by an invoking application, e.g., operating system 410 or one or more applications 412. In some implementations, an invoking application may be another machine learning application. For example, such configurations may be used in generative adversarial networks, where an invoking machine learning application is trained using output from machine learning application 410 and vice-versa.

Any of software in memory 404 can alternatively be stored on any other suitable storage location or computer-readable medium. Memory 404 and any other type of storage (magnetic disk, optical disk, magnetic tape, or other tangible media) can be considered "storage" or "storage devices."

For ease of illustration, FIG. 4 shows one block for each of processor 402, memory 404, I/O interface 406, and software blocks 408-414 and 432-436. These blocks may represent one or more processors or processing circuitries, operating systems, memories, I/O interfaces, applications, and/or software modules. In other implementations, device 400 may not have all of the components shown and/or may have other elements including other types of elements instead of, or in addition to, those shown herein. While some components are described as performing blocks and operations as described in some implementations herein, any suitable component or combination of components of environment 100, device 400, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer-readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (Saas) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
receiving, by one or more processors, a current time frame of speech data in a time domain;
transforming the current time frame to a current frequency frame of the speech data in a frequency domain;
determining, using a noise classifier implemented by the one or more processors, a classification of noise content in the current frequency frame based at least on noise content determined in the current frequency frame, wherein the classification is selected from at least two classifications detectable by the noise classifier, wherein the two classifications include a first classification associated with creating and applying a current noise suppression mask to the current frequency frame, and a second classification associated with applying a previously-created noise suppression mask to the current frequency frame without creating the current noise suppression mask;
in response to determining the first classification:
creating, by the one or more processors, the current noise suppression mask for the current frequency frame based on the noise content in the current frequency frame, wherein creating the current noise suppression mask includes determining one or more gain functions associated with one or more frequency bands of the current frequency frame; and
applying, by the one or more processors, the current noise suppression mask to the current frequency frame to suppress the noise content in the current frequency frame and obtain a current noise-suppressed frequency frame of the speech data;

in response to determining the second classification:
  selecting, by the one or more processors, the previously-created noise suppression mask, wherein the previously-created noise suppression mask was created and applied based on a prior frequency frame of the speech data; and
  applying, by the one or more processors, the previously-created noise suppression mask to the current frequency frame to suppress the noise content in the current frequency frame and obtain the current noise-suppressed frequency frame of the speech data, without creating the current noise suppression mask;
transforming the current noise-suppressed frequency frame of the speech data to a current noise-suppressed time frame of the speech data that is in the time domain; and
outputting the current noise-suppressed time frame of the speech data that provides audio output having reduced noise.

2. The method of claim 1, wherein the noise classifier uses a machine-learning model that is trained to determine the classification of noise content in frequency frames provided as input to the machine-learning model.

3. The method of claim 2, wherein the machine-learning model is trained based on speech data that does not include noise and noise data that includes background noise.

4. The method of claim 2, wherein the machine-learning model is trained using a speech quality predictor that estimates a quality of the speech data.

5. The method of claim 1, wherein determining the classification of the noise content in the current frequency frame is based on a determined magnitude of the noise content determined in the current frequency frame.

6. The method of claim 1, wherein determining the classification of the noise content in the current frequency frame is based on a determined rate of change of the noise content in the current time frame relative to determined noise content in one or more previous time frames.

7. The method of claim 1, further comprising:
  receiving a second time frame of the speech data in the time domain;
  transforming the second time frame to a second frequency frame of the speech data in the frequency domain;
  determining, using the noise classifier, whether to create a second noise suppression mask for the second frequency frame based at least on noise content determined in the second frequency frame;
  in response to determining to create the second noise suppression mask:
    creating a second noise suppression mask based on the second frequency frame, wherein creating the second noise suppression mask includes determining one or more gain functions associated with one or more frequency bands of the second frequency frame; and
    applying the second noise suppression mask to the second frequency frame to suppress the noise content in the second frequency frame and obtain a second noise-suppressed frequency frame;
  in response to determining to not create the second noise suppression mask:
    applying the current noise suppression mask to the second frequency frame to suppress the noise content in the second frequency frame and obtain the second noise-suppressed frequency frame of the speech data, without the creating and the applying of the second noise suppression mask;
  transforming the second noise-suppressed frequency frame to a second noise-suppressed time frame; and
  outputting the second noise-suppressed time frame of the speech data.

8. The method of claim 1, wherein determining the classification of the noise content in the current frequency frame is based on the determined noise content in the current frequency frame and determined noise content in one or more previous frequency frames.

9. The method of claim 1, wherein applying the current noise suppression mask to the current frequency frame is performed without applying the previously-created noise suppression mask.

10. The method of claim 1, wherein selecting the previously-created noise suppression mask includes selecting a most recent previously-created noise suppression mask created for a most recent prior frequency frame of the speech data.

11. The method of claim 1, wherein the noise classifier includes a statistical classifier, wherein the statistical classifier:
  compares data in the current frequency frame to previous data in one or more previous frequency frames using a similarity function or a distance function; and
  based on the comparison, determines whether a rate of change of noise in the one or more previous frequency frames and the current frequency frame meets a threshold that indicates the classification of the noise content in the current frequency frame.

12. A computing device comprising:
a processor; and
a memory coupled to the processor, with instructions stored thereon that, when executed by the processor, cause the processor to perform operations comprising:
  receiving, by the processor, a current time frame of speech data in a time domain after receiving a first time frame of the speech data in the time domain, wherein the current time frame and the first time frame include speech content, and wherein a first noise suppression mask is associated with the first time frame and created to suppress noise in the first time frame of the speech data;
  transforming the current time frame to a current frequency frame of the speech data in a frequency domain;
  determining, using a noise classifier, a classification of noise content in the current frequency frame based at least on noise content determined in the current frequency frame, wherein the classification is selected from at least two classifications detectable by the noise classifier, wherein the two classifications include a first classification associated with creating and applying a current noise suppression mask to the current frequency frame, and a second classification associated with applying a previously-created noise suppression mask to the current frequency frame without creating the current noise suppression mask;
  in response to determining the first classification:
    creating the current noise suppression mask for the current frequency frame based on the noise content in the current frequency frame, wherein creating the current noise suppression mask includes determining one or more gain functions associated with one or more frequency bands of the current frequency frame; and
    applying the current noise suppression mask to the current frequency frame to suppress the noise content in the current frequency frame and obtain a current noise-suppressed frequency frame of the speech data;

in response to determining the second classification:
selecting the first noise suppression mask; and
applying the first noise suppression mask to the current frequency frame to suppress the noise content in the current frequency frame and obtain the current noise-suppressed frequency frame of the speech data, without the creating and the applying of the current noise suppression mask;

transforming the current noise-suppressed frequency frame of the speech data to a current noise-suppressed time frame of the speech data that is in the time domain; and outputting the current noise-suppressed time frame of the speech data.

13. The computing device of claim 12, wherein the noise classifier uses a machine-learning model that is trained to determine the classification of noise content in frequency frames provided as input to the machine-learning model.

14. The computing device of claim 12, wherein the noise classifier includes a statistical classifier, wherein the statistical classifier:
compares data in the current frequency frame to previous data in one or more previous frames using a similarity function or a distance function; and
based on the comparison, determines whether a rate of change of noise in the current frequency frame and the one or more previous frames meets a threshold that indicates the classification of the noise content in the current frequency frame.

15. A device comprising:
at least one battery;
at least one microphone;
a communication circuit coupled to the battery and the microphone;
a processor coupled to the communication circuit, the battery and the microphone; and
a memory coupled to the processor, with instructions stored thereon that, when executed by the processor, cause the processor to perform operations comprising:
receiving, by the processor via the at least one microphone, a current time frame of speech data in a time domain;
transforming the current time frame of speech data to a current frequency frame of the speech data in a frequency domain;
determining, using a noise classifier, a classification of noise content in the current frequency frame based at least on noise content determined in the current frequency frame wherein the classification is selected from at least two classifications detectable by the noise classifier, wherein the two classifications include a first classification associated with creating and applying a current noise suppression mask to the current frequency frame, and a second classification associated with applying a previously-created noise suppression mask to the current frequency frame without creating the current noise suppression mask;

in response to determining the first classification:
creating the current noise suppression mask for the current frequency frame based on the noise content in the current frequency frame, wherein creating the current noise suppression mask includes determining one or more gain functions associated with one or more frequency bands of the current frequency frame; and
applying the current noise suppression mask to the current frequency frame to suppress the noise content in the current frequency frame and obtain a current noise-suppressed frequency frame of the speech data;

in response to determining the second classification:
selecting the previously-created noise suppression mask, wherein the previously-created noise suppression mask was created based on a prior frequency frame of the speech data; and
applying the previously-created noise suppression mask to the current frequency frame to suppress the noise content in the current frequency frame and obtain the current noise-suppressed frequency frame of the speech data, without creating the current noise suppression mask; and transforming the current noise-suppressed frequency frame of the speech data to a current noise-suppressed time frame of the speech data that is in the time domain.

16. The device of claim 15, wherein the noise classifier uses a machine-learning model that is trained to determine the classification of noise content in frequency frames provided as input to the machine-learning model.

17. The device of claim 15, wherein the noise classifier includes a statistical classifier, wherein the statistical classifier:
compares data in the current frequency frame to previous data in one or more previous frequency frames using a similarity function or a distance function; and
based on the comparison, determines whether a rate of change of noise in the current frequency frame and the one or more previous frequency frames meets a threshold that indicates the classification of the noise content in the current frequency frame.

\* \* \* \* \*